United States Patent

[11] 3,582,685

| [72] | Inventor | Lester N. Bolmgren |
| | | Richfield, Minn. |
| [21] | Appl. No. | 820,252 |
| [22] | Filed | Apr. 29, 1969 |
| [45] | Patented | June 1, 1971 |
| [73] | Assignee | Honeywell Inc., |
| | | Minneapolis, Minn. |

[54] ZERO CROSSOVER FIRING OF THYRISTOR MEANS
7 Claims, 1 Drawing Fig.

[52] U.S. Cl. .................................................. 307/252,
307/283, 307/295, 307/305
[51] Int. Cl. ..................................................... H03k 17/00,
H03k 1/16
[50] Field of Search ............................................ 307/252.90,
252.70, 252.21, 305, 283, 295

[56] References Cited
UNITED STATES PATENTS

| 3,183,372 | 5/1965 | Chin .............................. | 307/252 |
| 3,258,697 | 6/1966 | Guettel .......................... | 307/252 |
| 3,315,098 | 4/1967 | Eckl .............................. | 307/252 |
| 3,360,713 | 12/1967 | Howell .......................... | 307/252 |
| 3,365,588 | 1/1968 | Tussing ......................... | 307/252 |

OTHER REFERENCES
General Electric Controller Rectifier Manual, Gutzwiller, 1960, p. 87, F16,7.5

Primary Examiner—John S. Heyman
Assistant Examiner—David M. Carter
Attorneys—Lamont B. Koontz, Trevor B. Joike and Omund R. Dahle

ABSTRACT: The firing of an alternating current energized triac is controlled by a unijunction transistor. Both the base-to-base voltage and the triggering voltage of the unijunction transistor are supplied and controlled by a power supply which is synchronized to the alternating current source, such that the triac fires at near zero crossover of the alternating current. The firing is delayed, to occur approximately 3° after zero crossover, to insure latching current flow through the triac.

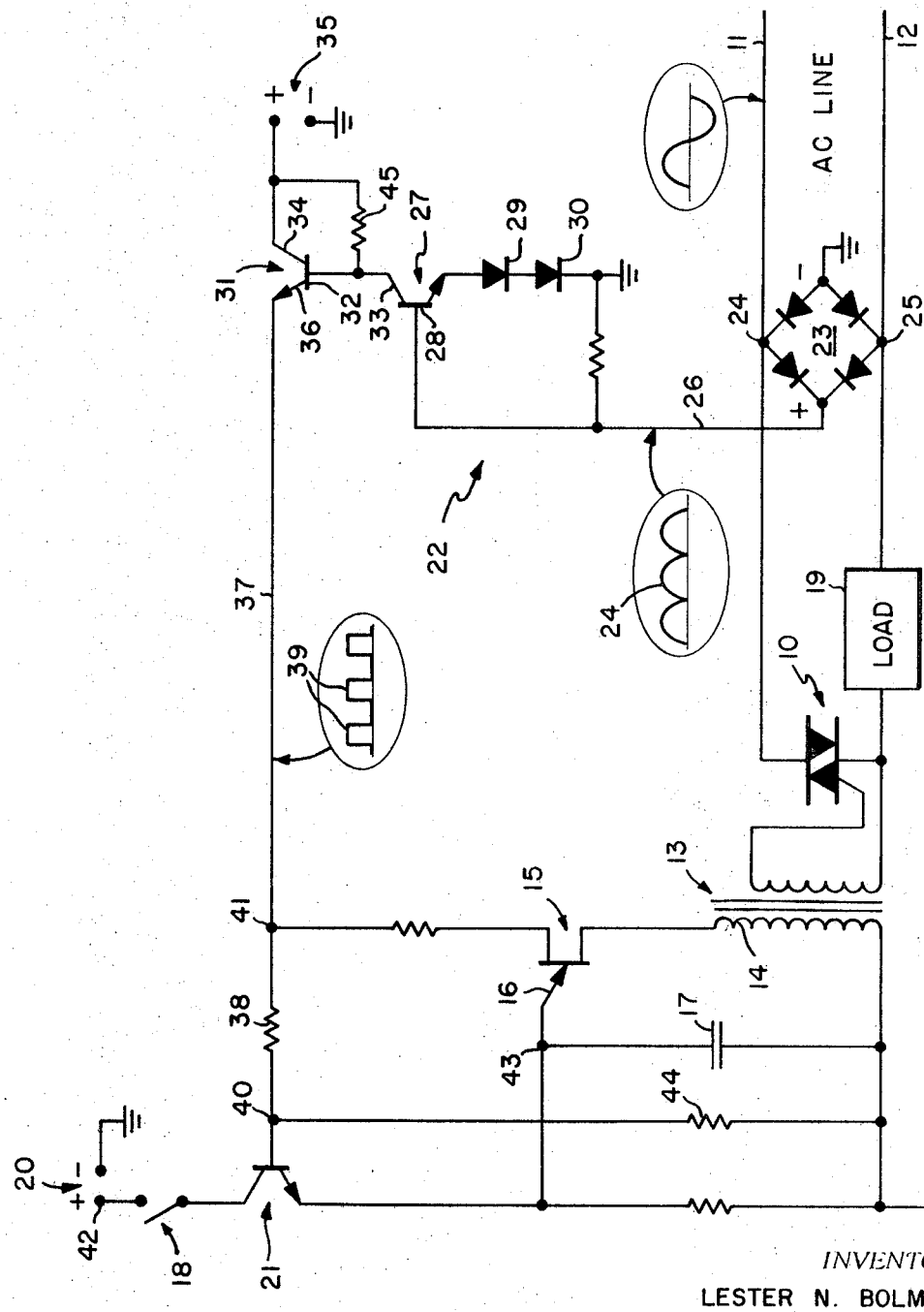

ZERO CROSSOVER FIRING OF THYRISTOR MEANS

BRIEF SUMMARY OF THE INVENTION

This invention is concerned with an improved structure for use in firing thyristor means, for example a triac, at zero crossover of an alternating current source.

A capacitor is connected to be charged upon the need for firing of the triac. This capacitor is connected to the emitter of a unijunction transistor, to control the firing of the transistor. The transistor, in turn, controls the firing of the triac.

This invention provides a synchronizing means in the form of a power supply which generates a voltage pulse of short time duration at each zero crossover of the alternating current source, for example, a square wave voltage pulse of 6 electrical degrees duration and 21 volts magnitude. Each voltage pulse is used to, (1) allow charging of the capacitor only during the short time duration, (2) supply a relatively high base-to-base voltage to the unijunction transistor during the short time duration, and (3) clamp the capacitor voltage at a relatively low value to prevent firing of the unijunction capacitor until the end of the short time duration, at which time the base-to-base voltage of the unijunction transistor is removed.

BRIEF DESCRIPTION OF THE DRAWING

The single FIGURE is a schematic showing of the preferred embodiment of the invention.

DESCRIPTION OF THE PREFERRED EMBODIMENT

Referring to the single FIGURE, thyristor means in the form of a triac 10 has its main current carrying electrodes connected to conductors 11 and 12, which conductors are adapted to be connected to a source of alternating current voltage. The firing of triac 10 is controlled by a transformer 13 whose primary winding 14 is connected in the base-to-base circuit of a unijunction transistor 15. The emitter electrode 16 of transistor 15 is connected to a capacitor 17 and, as is well known, the firing of transistor 15 is achieved by a discharge of capacitor 17, the discharge occurring in accordance with the magnitude relationship of the emitter voltage and the base-to-base voltage of the transistor.

Condition-responsive switch 18 is closed upon the need for energization of load 19. As will be explained, capacitor 17 is adapted to be charged to a given voltage from direct current source 20 when switch 18 is closed and when transistor 21 is conductive. By way of example, source 20 has a magnitude exceeding 10 volts.

This invention provides an improved structural arrangement for firing triac 10 at zero crossover times of alternating current source 11, 12. Specifically, synchronizing means 22 includes a full-wave rectifier 23 whose input terminals 24 and 25 are connected to alternating current source 11, 12. The output of full-wave rectifier 23, at conductor 26, is of the waveform identified by reference numeral 24. Thus it can be seen that the voltage on conductor 26 goes to zero at the zero crossover times of the alternating current source 11, 12.

Transistors 27 and 31 constitute controllable switch means responsive to zero crossover. Transistor 31 has its collector electrode 34 connected to the positive terminal of a source of direct current voltage 35, and has its base 32 connected to the positive terminal through resistor 45. The emitter electrode of this transistor is connected to conductor 37 and the base electrode 32 is connected to collector electrode 33 of transistor 27. The emitter electrode of transistor 27 is connected in circuit with diode means 29, 30 and base electrode 28 of this transistor is connected to receive waveform 24 on conductor 26. Thus, by way of example, transistor 27 is rendered conductive whenever the voltage on conductor 26 exceeds approximately 1.8 volts, and is rendered nonconductive for a short time duration spanning 3 electrical degrees each side of zero crossover of alternating current source 11, 12.

Again by way of example, source 35 is of a relatively high magnitude and may be a 21-volt direct current source. During the short time duration spanning zero crossover, transistor 27 is nonconductive, transistor 31 is conductive, and conductor 37 is connected to the positive terminal of source 35. Thus, the output voltage waveform on conductor 37 is as shown by waveform 39. This waveform consists of a square wave of short time duration, for example, 3° each side of zero crossover of alternating current source 11, 12, and of a positive 21-volt magnitude. The time duration of the waveform 39 can be increased by adding further diodes in series with diodes 29 and 30.

The output voltage on conductor 37 is connected to a voltage divider including resistors 38 and 44. These resistors may, for example, be 51,000 ohms and 47,000 ohms respectively. Thus, the positive voltage potential level at terminal 41 during the short time duration of waveform 39 is a relatively high 21 volts and the positive voltage potential level at terminal 40 is a relatively low 10 volts.

During the time that a voltage waveform 39 appears on conductor 37, transistor 21, which forms a gating means or normally open switch, is rendered conductive to connect positive terminal 42 of source 20 through switch 18 to charge capacitor 17. However, transistor 21 functions to clamp the capacitor voltage at terminal 43 at a given voltage, this being the 10-volts positive which appears at terminal 40.

The base-to-base voltage for unijunction transistor 15, as supplied by conductor 37, is approximately 21 volts. The characteristics of transistor 15 are selected such that with 21-volts base-to-base and with 10 volts on emitter 16, the transistor will not fire. However, at the end of the short time duration, approximately 3 electrical degrees after zero crossover of the alternating current source, voltage waveform 39 drops to zero. The base-to-base voltage of unijunction transistor 15 thus drops to zero and capacitor 17 discharges through output means in the form of primary winding 14 of transformer 13, causing triac 10 to fire and to energize load 19. The apparatus continues to fire each half-cycle of alternating current source 11, 12 so long as switch 18 remains closed. Thus, burst energization of load 19 is achieved. Triac 10 fires each half cycle of source 11, 12 at approximately 3° after zero crossover of source 11, 12.

The embodiments of the invention in which I claim an exclusive property or right are defined as follows:

1. In a control apparatus for zero crossover firing a thyristor means which is adapted to be connected to an alternating current source; the apparatus having a unijunction transistor with two base electrodes and an emitter electrode, a capacitor connected to said emitter electrode and adapted to be charged to a given voltage only upon the occurrence of a condition, and output means connected to one of said base electrodes and effective to produce an output to fire the thyristor means upon said capacitor discharging through a circuit which includes said emitter electrode and said one base electrode; the improvement comprising;

synchronizing means having an input connected to be energized by the alternating current source and having an output voltage consisting of voltage pulses of a limited time period which occur at approximately zero crossover of the alternating current source, gating means having an input connected to be controlled by the output voltage of said synchronizing means and having an output connected in circuit with said capacitor to allow said capacitor to charge to said given voltage only during said limited time period, and means for applying said voltage pulses of limited time period to the other of said base electrodes of said unijunction transistor to prevent firing of said unijunction transistor until the end of said limited time period.

2. Control apparatus as defined in claim 1 wherein said gating means includes controllable normally open switch means responsive to the output voltage waveform of said synchronizing means and closed only during said limited time period.

3. Control apparatus as defined in claim 2, including a source of charging voltage for said capacitor, wherein said switch means is a normally nonconductive transistor whose output electrodes connect said source of charging voltage in circuit with said capacitor and whose input electrode is connected to be controlled by the output voltage of said synchronizing means to render said transistor conductive only during said limited time period.

4. Control apparatus as defined in claim 3, wherein the input of said gating means comprises a voltage divider connected to be energized by the output voltage of said synchronizing means, wherein one of the output electrodes of said transistor is directly connected to said capacitor, wherein said transistor input electrode is connected to a low-voltage terminal of said voltage divider which is substantially equal in magnitude to said given voltage to thereby clamp the maximum charge of said capacitor at said given voltage, and wherein said means for applying said voltage pulses of limited time period to the other of said base electrodes of said unijunction transistor is connected to a high-voltage terminal of said voltage divider.

5. Control apparatus as defined in claim 1 wherein said synchronizing means includes;
a direct current voltage source of a high magnitude, and
controllable switch means connected to be controlled by the alternating current source and responsive to zero crossover of the alternating current source and connected to said source of direct current voltage for providing said output voltage.

6. Control apparatus as defined in claim 5 further comprising;
a source of charging voltage for said capacitor,
a voltage divider connected to be energized by said synchronizing means,
wherein said gating means includes a normally nonconductive transistor having output electrodes connecting said source of charging voltage to said capacitor, and having an input electrode connected to a terminal of said voltage divider whose voltage magnitude is substantially equal to said given voltage to thereby clamp the maximum voltage charge of said capacitor at said given level, and
wherein said means for applying said voltage pulses of limited time period to the other of said base electrodes of said unijunction transistor is connected to a higher voltage terminal of said voltage divider.

7. Control apparatus as defined in claim 5 wherein said controllable switch means includes;
a first transistor having a pair of output electrodes, one of which is connected to said direct current source, and having an input electrode,
a second transistor having a pair of output electrodes, one of which is connected to the input of electrode of said first transistor, and having an input electrode, full wave rectification means adapted to be energized by the alternating current source,
circuit means including diode means connecting the other output electrode and the input electrode of said second transistor to said full wave rectification means in a manner to render said second transistor nonconductive for said limited time period, and
wherein the other output electrode of said first transistor provides said output voltage.